G. HUGHES.
RESILIENT WHEEL.
APPLICATION FILED MAR. 25, 1919.
1,327,096.
Patented Jan. 6, 1920.
2 SHEETS—SHEET 1.
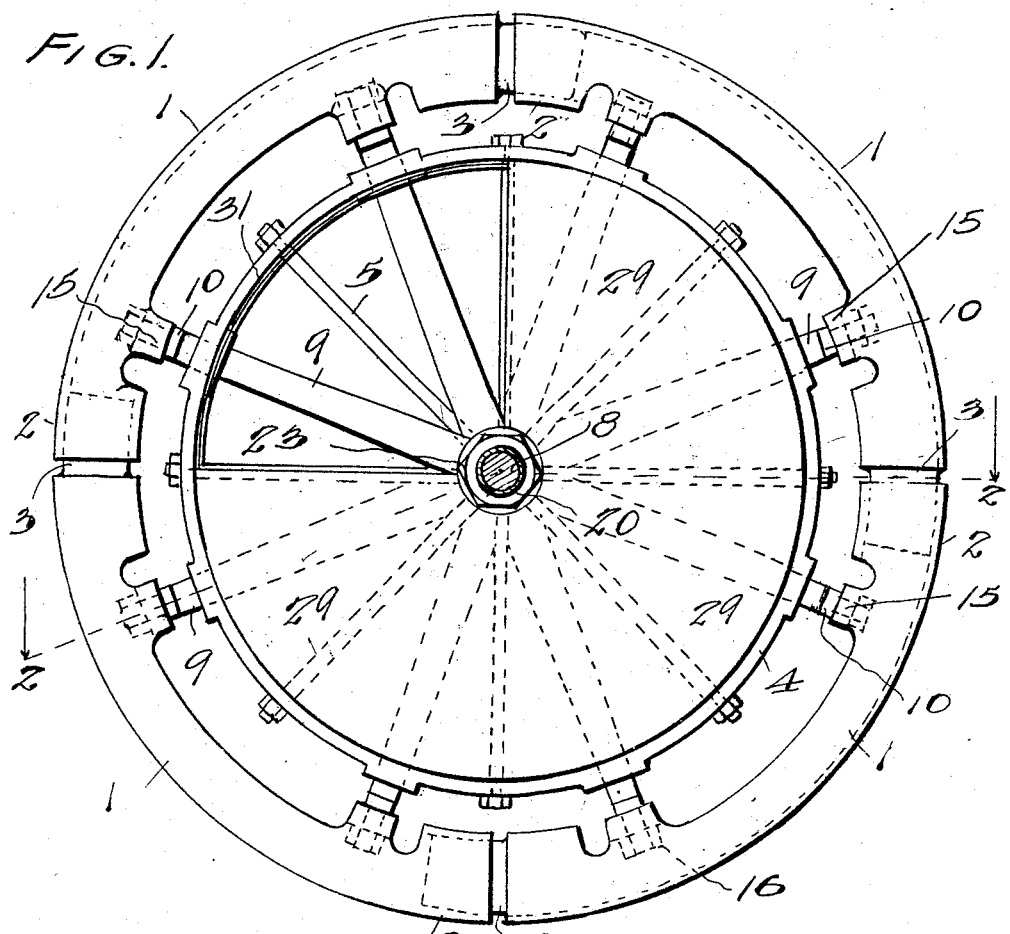
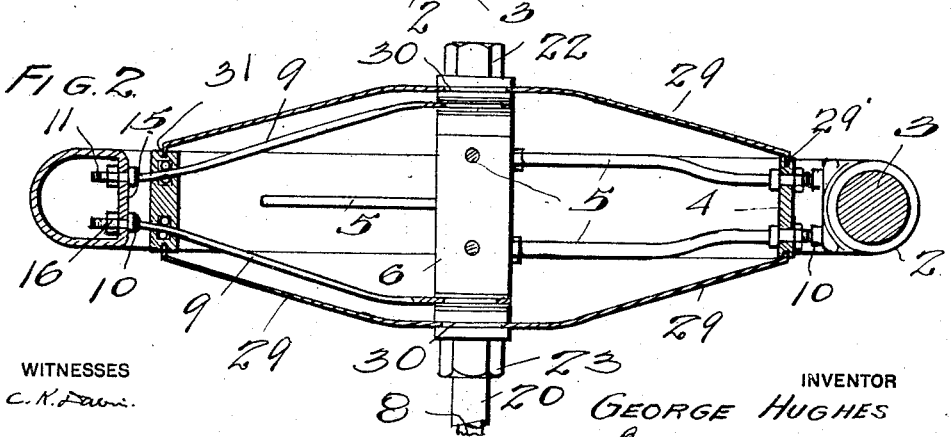
WITNESSES
C. K. Davis.
INVENTOR
GEORGE HUGHES
By Herman A. Phillips
attorney G. HUGHES.
RESILIENT WHEEL.
APPLICATION FILED MAR. 25, 1919.
1,327,096.
Patented Jan. 6, 1920.
2 SHEETS—SHEET 2.
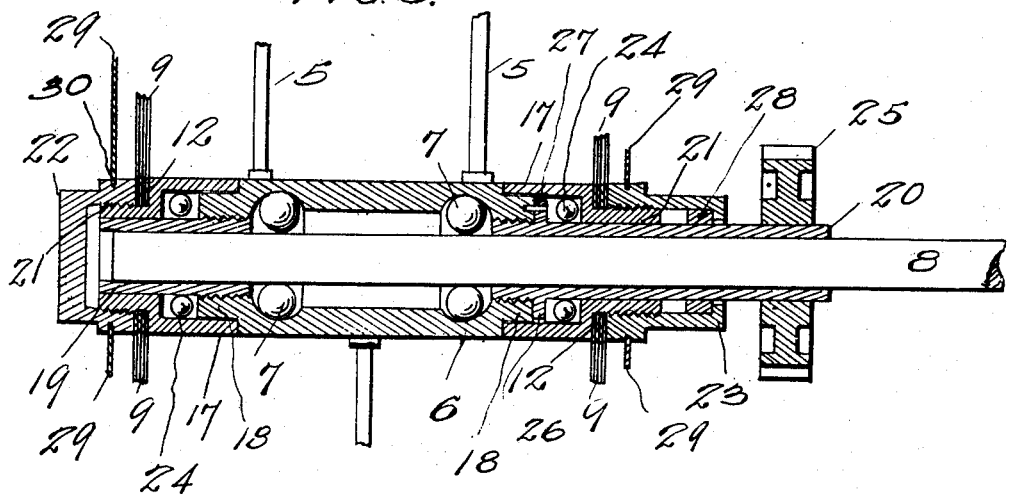
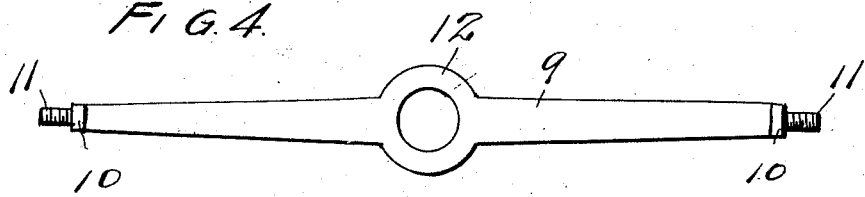
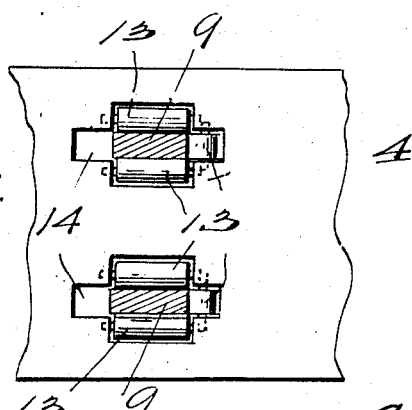
WITNESS:
CK David
INVENTOR.
GEORGE HUGHES
BY
Herman A. Phillips
ATTORNEY.

UNITED STATES PATENT OFFICE.

GEORGE HUGHES, OF ST. LOUIS, MISSOURI, ASSIGNOR OF ONE-HALF TO EDWARD HUGHES, OF ST. LOUIS, MISSOURI.

RESILIENT WHEEL.

1,327,096.  Specification of Letters Patent.  Patented Jan. 6, 1920.

Application filed March 25, 1919. Serial No. 284,887.

*To all whom it may concern:*

Be it known that I, GEORGE HUGHES, a citizen of the United States, residing at St. Louis, in the county of St. Louis and State of Missouri, have invented certain new and useful Improvements in Resilient Wheels, of which the following is a specification.

The present invention relates to improvements in resilient wheels designed especially for automobiles, trucks, etc., and intended to provide a durable, well cushioned wheel for absorbing shocks and irregular movements caused by rough traveling. The wheel forming the subject matter of the invention involves a tire adapted for reduction or diminution comprising a segmental tire of telescoping sections with radial spring spokes having a lateral movement under pressure and a rigid inner rim for guiding the movement of these spring spokes, and in certain other combinations and arrangements of parts as will be hereinafter described and claimed.

In the accompanying drawings I have illustrated one complete example of the physical embodiment of my invention, constructed and arranged according to the best mode I have so far devised for the practical application of the principles of the invention.

Figure 1 is a side elevation of a wheel involving the subject matter of the present invention, part of the side shield or housing being removed for convenience of illustration.

Fig. 2 is a sectional view of Fig. 1 at line 2—2, parts being omitted for convenience of illustration.

Fig. 3 is a longitudinal section of the hub portion of the wheel.

Fig. 4 is a view of one of the resilient spokes.

Fig. 5 is an enlarged, fragmentary, sectional view of a pair of spokes like Fig. 4 showing the anti-friction bearings or guides in the rigid rim for the resilient spokes.

In the preferred form of the invention as illustrated in the drawings I have shown an all-metallic wheel having a segmental tire, the segments being indicated by the numeral 1, and while there are only four of these segments illustrated, it will readily be apparent that the number utilized may be varied and increased if desired or required. At their intermediate portions these segments are semi-circular in cross section, while at their ends, each segment is fashioned with a cylindrical socket 2 and a projecting, cylindrical head 3, the head of one segment engaging in the socket of the adjacent segment, and these heads are free to slide in their sockets as the tire is deformed in the presence of an unusual load or shock to be absorbed by the resiliency of the shock absorbing parts of the wheel.

In addition to the deformable outer rim or tire, the wheel has an inner rigid rim 4 supported by the rigid radial spokes 5 from the cylindrical hub 6 of the wheel which hub is revoluble on the ball bearings 7 of the axle 8. As shown the rigid spokes 5 are arranged alternately in pairs and singly, and they rigidly connect the hub with the rigid rim 4 to form suitable braces between these rigid parts and perform the usual functions of rigid, radial spokes, when employed in wheels of this character.

The resiliency of the wheel is characterized by the use of diametrical spokes 9 made up of resilient metal and fashioned with shouldered ends or heads 10 and threaded extensions 11, while the central part of the spoke is fashioned as a hub member 12. There are illustrated in the drawings four sets of these spokes at each side of the wheel, and the outer portion of each spoke is passed outwardly through the rigid rim 4, before being shouldered and before the parts of the axle are assembled, and the rim is provided with anti-friction bearings or rollers 13 at three sides of the spoke, while at the fourth side the slot 14 through which spoke passes is free and open in order to accommodate the spoke when it is moved on its axis with the telescoping segment of the tire to which its outer end is attached. The outer ends of the spokes are all fixed to the segmental tire, with the threaded end of the spoke passed through the perforated cross bars 15 of the tire and secured by nuts 16 within the tire opposite the shoulder 10 of the spoke.

The two sets of resilient spokes are carried on the hub by opposed boxings 17 which are cylindrical end caps having their ends fitted over the two end extensions 18 18 of the hub 6, and these two extensions have internal threads to receive the respective sleeves 19 and 20 that are screwed into them and which surround, loosely, the axle 8.

At their outer ends the boxings 17 are fashioned with reduced bosses 21 fitting around the sleeves 19 and 20 and it will be seen from the drawings that the hub portions of the spokes are fitted over these bosses and clamped thereon by the respective lock nuts 22 and 23 at the ends of the hub of the wheel, the bosses of course being threaded for the reception of the lock nuts. The boxings 17 are designed to slide axially of the hub, away from each other as the segmental tire is deformed, the inner ends of the boxings sliding on the hub extensions 18, and supported in their lateral movement on the ball bearings indicated at 24, 24.

From this description of the drawings, it will readily be apparent that as the segments of the tire telescope under pressure of a load, the resilient spokes will bulge or bend outwardly, and the boxings may slide outwardly and inwardly as the resilient spokes are flexed due to the movement of the segments as the weight of the load successively comes upon them and leaves them as the wheel travels.

When the wheel is to be used as a traction wheel it is driven through the pinion 25 fixed on the driving sleeve 20, and to insure rigid co-action between this driving sleeve and the hub to which it is threaded, the sleeve is formed with a disk 26 and pins 27 are used to hold the sleeve and hub against relative movement, and permit both forward and reverse driving of hub and its wheel. At 28 a collar is fixed on the sleeve 20 to prevent excessive movement of the boxings on the sleeves, and at 29, etc., are arranged thin, resilient sheet metal plates, as for instance bronze, that will flex with the resilient spokes and yet remain in position at all times to act as a shield for them. These shields are preferably segmental in character, four being arranged at each side of the wheel, and they are provided with curved inner ends that may be "snapped" into the grooves 30, 30 of the two lock nuts 22 and 23, and at their outer ends are formed with flanges 29' to be "snapped" in the grooves 31 in the inner rigid rim. This arrangement and construction of parts is shown in Fig. 1 to advantage, where one of the resilient metal plates is omitted and the rigid and flexible spokes disclosed.

What I claim is—

1. The combination with a rigid hub and inner rim having openings, of a deformable outer tire, spokes of resilient metal passed through said inner rim openings and secured to portions of the tire, said spokes being carried by the hub, and having laterally yielding connections with said hub.

2. The combination with a hub and resilient spokes, of boxings extending over the hub and supporting the spokes, an axle, sleeves on the axle secured to the hub, lock nuts for securing the spokes on the boxings, and ball bearings for lateral movement of the boxings interposed between the boxings and the sleeves.

3. The combination with a hub and deformable tire, of an axle, sleeves surrounding the axle and threaded into the hub, boxings slidable on the sleeves and hub, resilient spokes carried by the boxings, and clamp nuts threaded on the boxings for the spokes, there being lateral thrust ball bearings between the boxings and sleeves.

In testimony whereof I affix my signature.

GEORGE HUGHES.